(No Model.)
J. H. STEVENS, Jr.
BEARING FOR WATER CLOSET SEAT ATTACHMENTS.
No. 525,396. Patented Sept. 4, 1894.
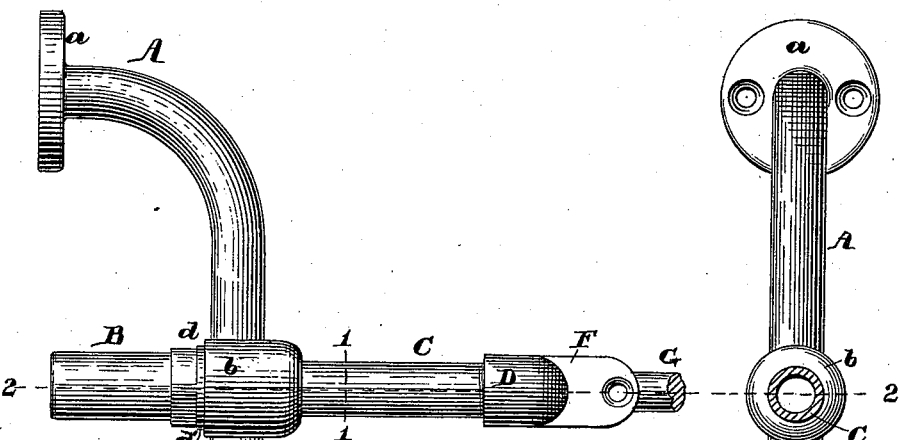
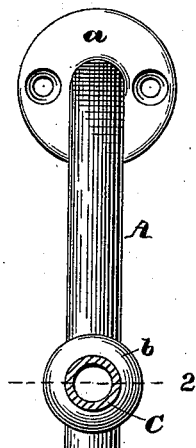
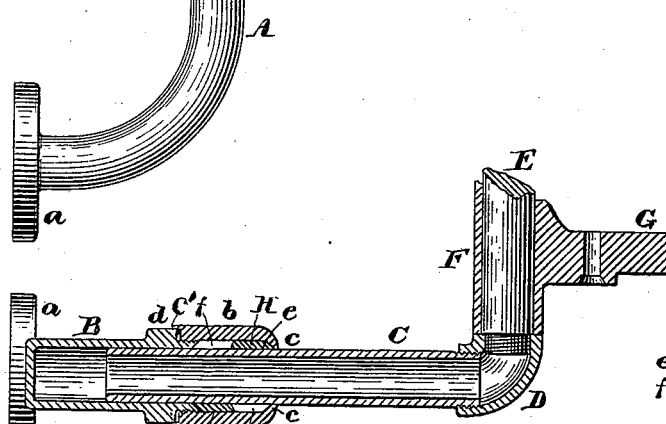
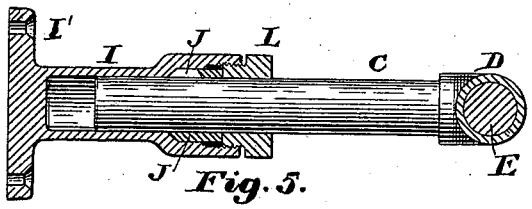
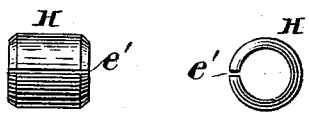
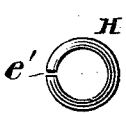
Witnesses:
Walter E. Lombard.
Geo. A. Sewall
Inventor
John H. Stevens, Jr.,
by N. C. Lombard
Attorney.

UNITED STATES PATENT OFFICE.

JOHN H. STEVENS, JR., OF CAMBRIDGE, MASSACHUSETTS.

BEARING FOR WATER-CLOSET-SEAT ATTACHMENTS.

SPECIFICATION forming part of Letters Patent No. 525,396, dated September 4, 1894.

Application filed February 17, 1894. Serial No. 500,538. (No model.)

*To all whom it may concern:*

Be it known that I, JOHN H. STEVENS, Jr., of Cambridge, in the county of Middlesex and State of Massachusetts, have invented certain new and useful Improvements in Adjustable Bearings for Water-Closet-Seat Attachments and other Purposes, of which the following, taken in connection with the accompanying drawings, is a specification.

My invention relates to adjustable bearings for water closet seat attachments and other purposes and it consists in certain novel features of construction, arrangement and combination of parts which will be readily understood by reference to the description of the accompanying drawings and to the claims hereto appended and in which my invention is clearly pointed out.

Figure 1 of the drawings is a side elevation of a bracket and the hinge of a water closet seat attachment. Fig. 2 is a transverse section on line 1, 1, on Fig. 1 and showing the bracket in elevation. Fig. 3 is a horizontal section on line 2, 2, on Figs. 1 and 2. Fig. 4 is a side view of the split sleeve. Fig. 5 is a sectional elevation illustrating a modification of the bracket and the split sleeve. Fig. 6 is a side view of the split sleeve shown in Fig. 5, and Figs. 7 and 8 are respectively a side elevation and an end view of another modification of the split sleeve.

In the drawings A is a bracket provided with the flanges $a$ $a$ by which and suitable screws it is to be attached to the wall or other fixed portion of a building or other structure, and provided with a tubular hub $b$ one end of the bore of which is contracted by the annular lip $c$ the inner surface of which forms a frusto conical surface as shown in Fig. 3.

The opposite end of the bore of the hub $b$ has formed therein a female screw thread to which is fitted the threaded end of the sleeve B closed at its opposite end and having a section of its outer-surface made hexagonal, as at $d$, to receive a wrench for adjusting it to position, its inner end being made frusto-conical as shown. The hub $b$ has formed upon its end, opposite to the inwardly projecting lip $c$, another annular lip $c'$, which projects therefrom over and surrounds, and fits closely to, a smooth round portion $d'$ of the gland B, so as to inclose the thread on said gland and cover the joint or space between the end of the said hub and the shoulder on the gland and thus prevents the possibility of the accumulation of dirt therein.

The inner diameter of the sleeve B corresponds to the inner diameter of the lip $c$ and both are made to fit nicely the rod or arm C one end of which is connected by the quarter bend D to the pintle E which in the drawings represents portions of the stationary or non revoluble part of a hinge of a water closet seat and F represents a portion of the sleeve which forms the revoluble portion of the hinge, and G a portion of one of the arms which enter sockets in the seat all as shown and described in another application of mine of even date herewith.

H is a short section of a tube or sleeve having an inner diameter to closely fit the exterior of the rod or arm C, has its ends made frusto-conical, as at $e$, and is slitted longitudinally, either by a single cut $e'$, extending through its entire length as shown in Figs. 7 and 8, or by two series of slits $f, f$, extending inward from each end to the middle of its length as shown in Fig. 4. This split sleeve is slipped upon the end of the arm C after said arm has been passed through the hub $b$ of the bracket or stand A and then the sleeve B is slipped upon the arm C and screwed into the hub $b$ till the frusto-conical surfaces $e$ of the bushing or sleeve H are engaged by the correspondingly shaped surfaces in the hub $b$ and the inner end of the sleeve B with sufficient force to contract said bushing or sleeve H and cause it to grip the arm C and clamp it firmly in position in the hub $b$.

To adjust the rod or arm C endwise in its bearing in the hub $b$, the sleeve B is partially unscrewed, thus relieving the pressure upon the conical surfaces $e$ of the bushing H when said bushing expands to its normal condition, the arm C is then moved endwise to the desired position and held in such position until the sleeve B is screwed up hard against the sleeve H as before, it being understood that the sleeve H is fitted to the arm C so that when in its normal condition it will require the exercise of some force to move it endwise of the arm when once adjusted to the desired position. In some cases instead of using the bracket A I use a short pipe I having a flange I' at one end and having its bore enlarged at its opposite end with a frusto-conical surface at the inner end of said enlarged bore; and instead of the bushing or sleeve H having two frusto-conical ends I use the bushing J having one frusto-conical end and its other end at right angles to its axis and having only one series of longitudinal slits as shown in Fig. 6, and have fitted on the arm C the threaded ring or gland L which screws in the enlarged bore of the pipe I and bears against the sleeve J to press its frusto-conical end into engagement with the correspondingly shaped surface within the pipe I all as shown in Fig. 5.

I am aware that it is common to secure rods in bearings by means of set screws so that said rods may be adjusted therein, and also that such rods have been secured in position so as to be adjustable by threading said rods and fitting two nuts on each rod one at each side of the hub in which it has its bearing as shown in my before cited application, but in many places it is desirable to avoid the use of projecting screw heads and exposed screw threads in order to facilitate the keeping the parts clean, and especially is this true in the case of uninclosed water closets.

By the construction shown and described the chances for the lodgment of dirt of any kind are reduced to a minimum, and all the parts are so formed, and so free from projections or irregularities that they may be easily wiped with a cloth to clean them.

The inner face of the lip c may be made at right angles to the axis of the hub b, and the shoulder in the stand I at the junction of the larger and smaller bores thereof may be made at right angles to the axis of said stand and the bushing J be used in either case with its non-conical end in contact with the lip c in the one case or with the shoulder in the stand I in the other case, a frusto conical surface being formed on the end of the gland L to engage the corresponding surface on the bushing J, without affecting the principles of my invention.

What I claim as new, and desire to secure by Letters Patent of the United States, is—

1. In an adjustable bearing or support for water closet seat attachments, the combination of a bracket or stand provided with means for securing it to the wall or other fixed portion of a building, and with a hub having a bore of two different diameters; a rod or arm mounted therein and made to fit the smaller of said two diameters; a split or slitted bushing or sleeve made to fit closely the periphery of said rod or arm, but movable thereon, and having a frusto-conical end, and adapted to enter the larger bore of said hub; a sleeve or gland fitted to said rod or arm and screwed into said larger bore of said hub; a frusto-conical surface formed in said hub or gland and adapted to engage the frusto-conical surface on said bushing to contract it upon said rod or arm; a bar or rod connected rigidly to said rod or arm at right angles thereto; and means having provision for pivotally connecting a closet seat thereto.

2. The combination of a bracket or stand provided with a hub having a bore of two different diameters; a rod or arm mounted therein and made to fit the smaller of said two diameters; a split or slitted bushing or sleeve made to fit closely the periphery of said rod or arm, but movable thereon, and having a frusto-conical end and the main body of its outer surface parallel to its inner surface, and adapted to enter the larger portion of the bore of said hub; a sleeve or gland fitted to said rod and screwed into said larger bore of the hub; a frusto-conical surface formed in said hub or gland to engage the frusto conical surface on said bushing; and an annular lip formed on said hub and surrounding and fitting closely to said gland beyond its threaded portion.

3. The combination of a bracket or stand having means for securing it to the wall or other fixed portion of a building, and provided with a hub having a bore of two different diameters; a rod or arm mounted therein and made to fit the smaller of said diameters; a split or slitted bushing or sleeve made to fit closely the periphery of said rod or arm, but movable thereon, and having a frusto-conical end, with the main body of its outer surface parallel to its inner surface, and adapted to enter the larger portion of the bore of said hub; a sleeve or gland fitted to said rod or arm and screwed into said larger portion of the bore of said hub; a frusto-conical surface formed in said hub or gland to engage the frusto-conical surface on said bushing; an annular lip formed on the end of said hub and surrounding and fitting closely to the periphery of said gland; a bar or rod connected rigidly to said rod or arm at right angles thereto; and means having provision for pivotally connecting a closet seat thereto.

In testimony whereof I have signed my name to this specification, in the presence of two subscribing witnesses, on this 14th day of February, A. D. 1894.

JOHN H. STEVENS, Jr.

Witnesses:
N. C. LOMBARD,
JAMES T. MURRAY.